United States Patent [19]

Reeves et al.

[11] 4,295,542
[45] Oct. 20, 1981

[54] SEISMIC EXPLORATION WITH DISPOSABLE SEISMIC DETECTORS

[75] Inventors: H. Neal Reeves; Roy E. Burnett; Leslie R. Denham; George E. Shields, all of Houston, Tex.

[73] Assignee: Seiscom Delta Inc., Houston, Tex.

[21] Appl. No.: 70,241

[22] Filed: Aug. 27, 1979

[51] Int. Cl.³ .................... G01V 1/047; G01V 1/13
[52] U.S. Cl. .................................... 181/108; 181/106; 181/111; 181/401; 367/56; 367/57
[58] Field of Search ............... 181/108, 101, 106, 110, 181/111, 113, 401; 175/1, 40, 50; 367/56, 57, 37

[56] References Cited
U.S. PATENT DOCUMENTS

| 1,676,619 | 7/1928 | McCollum | 181/108 |
| 1,978,668 | 10/1934 | Burg | 181/108 |
| 2,718,930 | 9/1955 | Bazhaw | 367/57 |
| 3,942,606 | 3/1976 | Dick | 181/401 |

FOREIGN PATENT DOCUMENTS 372530  3/1973  U.S.S.R. .............................. 181/106

Primary Examiner—Nelson Moskowitz
Attorney, Agent, or Firm—Pravel, Gambrell, Hewitt, Kirk, Kimball & Dodge

[57] ABSTRACT

Seismic sources and detectors are each positioned in a series of shotholes along a course to be explored. The sources in the shotholes are activated in a sequence along the course and caused to emit seismic waves. The detectors remaining along the course sense or detect the seismic waves which are then recorded. Since the detector at each shothole has performed its function, that of sensing signals from earlier shots in the sequence, its disposal by destruction when the source in the shothole with it is activated does not impair further surveying efforts.

7 Claims, 4 Drawing Figures

U.S. Patent  Oct. 20, 1981  Sheet 1 of 2  4,295,542
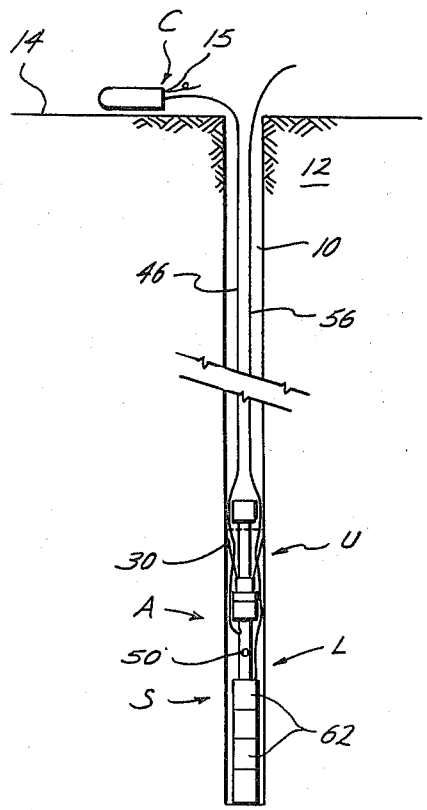
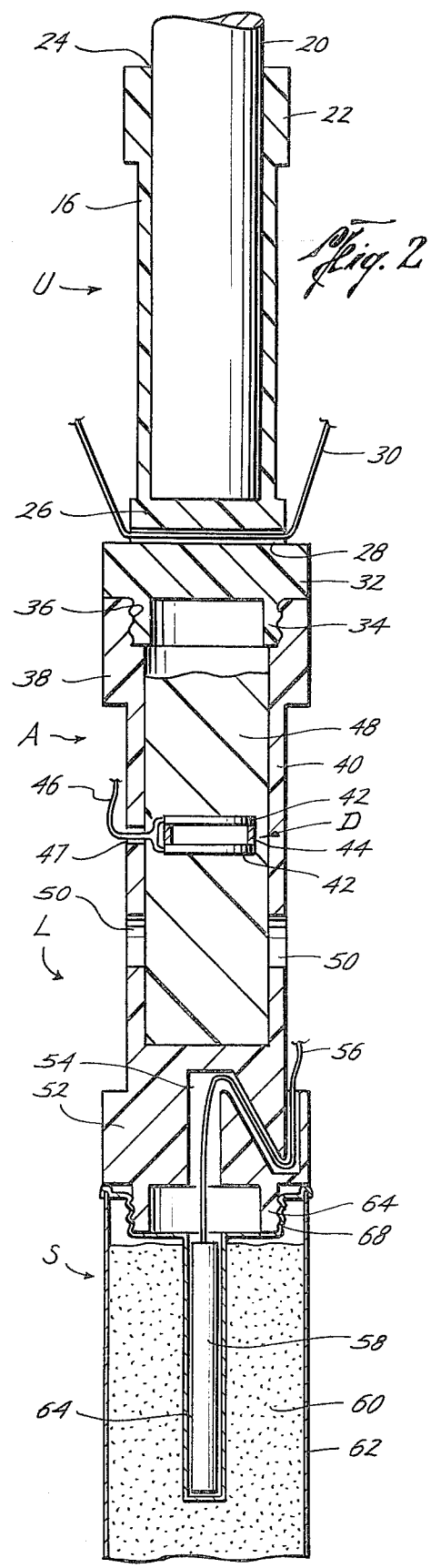
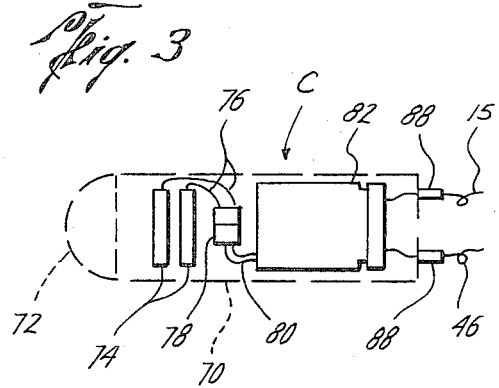

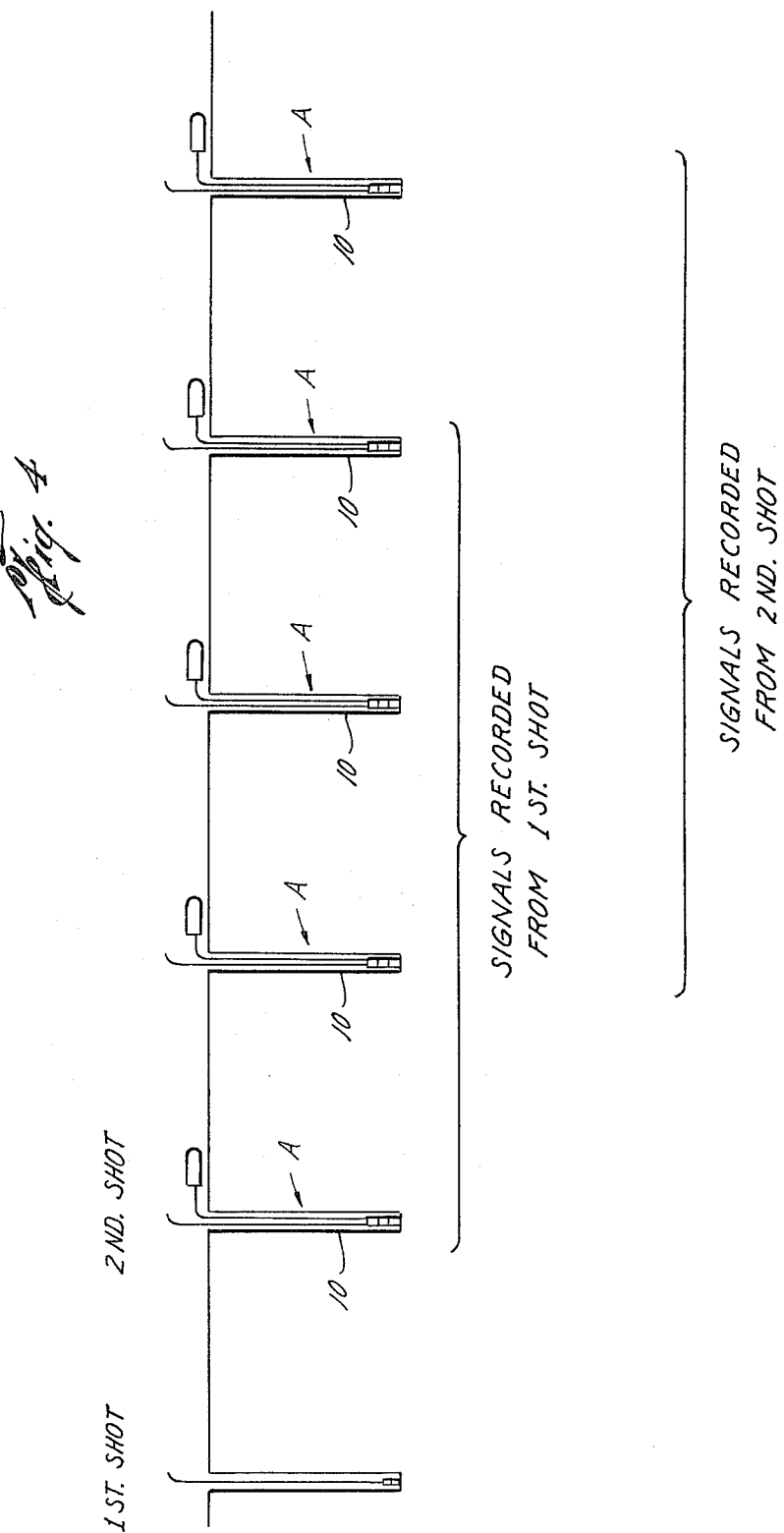

SEISMIC EXPLORATION WITH DISPOSABLE SEISMIC DETECTORS

FIELD OF INVENTION

The present invention relates to seismic exploration.

DESCRIPTION OF PRIOR ART

Prior art seismic detectors or geophones have been designed to be repeatedly used many times over a period of many months. This has led manufacturers to increase the ruggedness of these detectors. The severity of usage conditions of the detectors was such that even under the best condition and with normal maintenance, some percentage of the detectors being used in a seismic survey differed significantly from the ideal response indicated in a manufacturers' specifications. The geophysical industry recognized this fact and accepted it, within limits, as a necessary compromise from ideal conditions.

Through the years seismic recording instrumentation development has allowed greater dynamic resolution and recording of seismic signals with significantly improved fidelity. Higher frequency recording has become a primary requirement in many geophysical surveys in order to delineate the very subtle geologic features (thin bedding, etc.) which are quite often of interest in engineering, minerals, and geophysical/geological seismic surveys.

The design of seismic detectors has also undergone changes in order to realize the full potential of instrumentation development. Prior art detector designers have been confronted with two significant obstacles to realizing optimum resolution needed to achieve seismic survey objective. One obstacle was the use of multiple detectors being placed spatially. Summing the signals received in such multiple detectors limited the frequency resolution due to it stretching effect on the total pulse. The signal recorded at each detector in a group to be summed was slightly out of alignment with the other detectors in the group because of different signal arrival times at each detector location. A second, more serious problem was encountered due to the fact that the earth acted as an acoustic filter which, in the time domain, attenuates the higher frequencies at a significantly higher rate than it attenuates the lower frequencies. This problem is significant in the very near surface (first few inches to the first few tens of feet) where the unconsolidated near surface materials act to absorb the higher frequency components of the seismic wave.

Two modifications have been introduced and are currently being used on a limited basis. The first has been to use single detectors rather than strings of multiple detectors to sense the seismic signals. The second has been to place the single detectors in drilled holes at a depth (often several tens of feet) below much of the unconsolidated near surface materials which so severely attenuate the high frequency components of the seismic signal.

The ability to recover these detectors once they are placed within the water table down a drilled hole some several tens of feet below the surface of the earth has resulted in the physical loss of a significant percentage of said prior art phones. Such losses introduce operational delays and cause replacement costs.

SUMMARY OF INVENTION

Briefly, the present invention provides a new and improved method of seismic or geophysical exploration with new and improved apparatus. The apparatus are positioned in a series of shotpoints or shotholes along a course to be explored, which may be: a straight line; a three-dimensional array or grid of a particular configuration; or an irregular course where earth surface terrain features prevent straight line or three-dimensional exploration.

Each of the apparatus includes a geophone or seismic signal sensor contained therein and has structure for connecting a seismic signal source, usually explosive, thereto. An electronic circuit connected to the signal sensor is located near the shothole to provide the seismic signals to a suitable recording instrument. When the apparatus are located in the shotholes with explosives connected therewith, surveying begin with the sources being sequentially activated. Seismic waves are detected by the detectors in the other shotholes which have not yet had their sources activated. Surveying proceeds along the line of profile in a predetermined sequence until the survey has been completed.

BRIEF DESCRIPTION OF THE DRAWINGS

FIG. 1 is a cross-sectional view of a portion of the earth having a shothole formed therein and containing an apparatus according to the present invention;

FIG. 2 is an elevation view, taken in cross-section of a portion of the apparatus of FIG. 1;

FIG. 3 is a schematic diagram of another portion of the apparatus of FIG. 1; and FIG. 4 is a schematic diagram of a seismic exploration method according to the present invention.

DESCRIPTION OF PREFERRED EMBODIMENT

In the drawings, the letter A designates generally an apparatus according to the present invention for conducting seismic exploration operations. The apparatus A are adapted to be inserted into a shothole 10 (FIG. 1) drilled in an earth formation 12 along a course to be explored during seismic exploration operations. The shothole 10 is drilled to a depth in the formation 12 sufficiently deep enough below earth surface 14 so that the apparatus A is beneath the near surface weathering layer of the earth, which may be in some cases forty or fifty feet. Since the weathering layer is normally close to the water table, the shothole 10 in the vicinity of the apparatus A typically fills with water, as shown in the drawings.

The course to be explored with the apparatus A may be a conventional straight line, or an intersecting grid of transverse straight lines, a circular, square or other three-dimensional configuration, or an irregular course where earth surface terrain features prevent orderly disposition of the apparatus A along the course in a predetermined pattern.

The apparatus A includes a geophone or seismic signal sensor or detector D mounted in a lower body member L. The lower body L further has structure therewith, to be set forth below, for connection with a seismic signal source, usually dynamite or some other suitable explosive. The apparatus A further includes an upper body member U of the same general configuration as the structure set forth in U.S. Pat. No. 3,280,742, assigned to the assignee of the present invention. The apparatus A further includes an electronic circuit C which is connected to the sensor D and is located on the ground surface 14 adjacent the shothole 12 to provide the seismic signals detected by the detector D to a suitable, conventional seismic recording instrument over a conductor 15.

Considering the apparatus A more in detail, the upper body member U includes a tubular member 16 in the preferred embodiment having an internal upwardly extending socket or recess formed adjacent a surface 18 in order to receive a loading pole 20 for the purposes of insertion of the apparatus A into the shothole 10. If desired, a reinforcing collar 22 may be provided at an upper end of the tubular member 16 adjacent an opening 24 into which the loading pole 20 is inserted.

The upper body member U further includes an intermediate body portion 26 through which an anchor receiving aperture or slot 28 is formed so that a suitable anchor 30 may be inserted in order to anchor the apparatus A at the proper position in the shothole 10. A connector portion 32, preferably of increased thickness for added strength is formed on the upper body member U beneath the intermediate portion 26 and has a threaded sleeve portion 34 extending downwardly therefrom.

The threaded sleeve 34 of the upper body member U engages a corresponding threaded surface 36 formed in a connector member 38 of the lower body member L to interconnect the body members U and L. If desired the connecting threaded surfaces may be reversed from the configuration shown so that the sleeve 34 has a threaded inner socket to receive a threaded connector pin of connector 38 extending upwardly into the inner socket. It is also to be noted, however, that if desired, the apparatus A may be formed by having the upper body U and the lower body member L as a single unitary member, if desired.

The lower body member L further includes a container member 40 having a hollow interior portion formed therein for receiving the sensor or detector D. The detector D includes a suitable number of piezoelectric transducer discs 42 spaced from each other by metallic spacer members 44. The transducers 42 are electrically connected to a conductor pair 46 which extend through a port 47 in container member 40 to electrically connect the detector D with the amplifier circuit C.

The piezoelectric crystal transducers 42 respond to vibrations transmitted thereto from earth formations in the area where seismic exploration operations are performed and convert such vibrations into electrical signals which are transferred over the conductor pair 46 to the electronic circuit C, which conditions the electrical signals and provides them over conductor 15 to suitable seismic recording equipment.

The transducers 42 and the spacer members 44 are preferably encapsulated within a synthetic resin (such as epoxy) block 48 which substantially fills the interior of the body member 40. A suitable number of inlet ports 50 are formed in the body member 42 to permit vibrations from the earth formations 12 to be transferred through the medium in the shothole 10 to the sensor D.

The lower body member L further includes a detonator connector member 52 through which a suitable passage 54 is formed for passage of a firing wire 56. As is conventional, the firing wire 56 extends upwardly through the shothole 10 to a suitable electrical signal source, which, on activation, transmits electricity through the firing wire 56 to detonate an explosive cap 58 in order to ignite the explosive material 60 contained within an explosive container 62 of the seismic source S. The explosive container 62 has a suitable pocket or recess 64 formed therein to receive the detonator cap 58.

The detonator connector 52 of the lower body member L has a connector sleeve 66 formed extending downwardly therefrom to engage and connect with a corresponding threaded surface 68 of the explosive container 62. Although the connector member 66 of detonator connector 52 is shown as extending downwardly into the socket 68 of the source S, it should be understood that the connector member 52 may be modified to have a recess formed therein to receive an upwardly extending connector threaded surface from those type of explosive containers having male fittings thereon.

The source S includes a suitable number of explosive container 62 threaded together with each other and connected to the lower body member L therebelow, with the topmost such container 62 containing the explosive cap 58 for detonation purposes.

Considering now the amplifier circuit C (FIG. 3), such circuitry is contained within a housing member 70 having a removable cap 72 for access to such circuitry. A suitable number of batteries or electrical power supplies 74 are contained within the housing 70 to provide operating electrical power over conductors 76 through a power connector 78 and conductor 80 to a printed circuit board 82 containing the circuit C thereon. The electronic circuit C serves as a signal conditioning device and as impedance matching between the high impedance transducers 42 and what is typically relatively low impedance recording instrumentation. The printed circuit board 82 is connected so that the conductor pair 46 are electrically connected to the electronic circuit C to provide the electrical signals representing seismic waves detected during seismic exploration. Electronic circuit C conditions these signals and provides them over conductor 15 to the seismic recording instrumentation. Suitable packing glands 88 are mounted with the housing 70 to prevent water or material from entering the housing 70 through openings formed therein for passage of the conductors 15 and 46.

In the operation of the present invention, a plurality of shotholes 10 are drilled in a body of earth along a course over which seismic exploration operations are to be perfomed. If desired, the first such shothole 10, as indicated in FIG. 4, need not receive an entire apparatus A, but may receive therein only one of the seismic sources S. The remaining shotholes 10 along the course being surveyed each receive therein an apparatus A according to the present invention with the circuit C thereof located nearby. A suitable number of such shotholes are located along the course of the survey in accordance with the data requirements of the survey, such as the fold of spread for common depth point stacking. Where other types of seismic exploration are being performed, the number of shotholes 10 to receive apparatus A are specified based on the user's data requirements for such exploration. If desired, more than the requisite number of recordings may be obtained for an enhanced statistical base by increasing the number of shotholes 10 which receive apparatus A therein for each seismic detonation by inserting apparatus A into additional shotholes 10 along the course of the survey greater that the required number of recordings. It is to be understood that the four shotholes recorded for each shot as illustrated in the drawings is given only by way of example and that far greater numbers may be used in actual surveying operations.

Exploration operations begin by activating the seismic source S in the first shothole 10 causing the source S to transmit seismic waves into the earth formation. The seismic waves travel through the earth formations and cause reflection events which return upwardly to the sensors D in the shotholes 10 along the course of the survey. The detectors D sense these seismic waves and form electrical signals which are transmitted to the electronic circuit C for conditioning and transmission to the recording instrumentation where the signals are recorded for processing.

At a suitable length of time after activation of the first seismic source S, the seismic source S in the next shothole along the course of the survey, as indicated at FIG. 4 in the drawings, is activated as the second shot, causing seismic waves to be emitted. Returned seismic waves from the earth formation are detected in the remaining apparatus A along the course of the survey and recorded in the recording instrumentation.

The sensor S in the shothole where the source S is activated is, of course, destroyed by the detonation. However, this particular source D has performed its required function by sensing seismic waves from earlier seismic shots in the exploration sequence, but such destruction does not in any way impair seismic exploration operations of the present invention. Further, the electronic circuit C is available for subsequent use, together with a portion of the conductor 46 extending into the shothole 10.

Surveying operations continue along the course over which seismic data are to be acquired in the foregoing manner, with each source S being activated in sequence to emit seismic waves, destroying the sensor D associated therewith but emitting seismic waves which are detected by the detectors D remaining along the course to be surveyed. It should be understood that the apparatus A of the present invention may be used for refraction surveying as well as reflection surveying, as well.

The foregoing disclosure and description of the invention are illustrative and explanatory thereof and various changes in the size, shape and materials as well as in the details of the preferred embodiment may be made without departing from the spirit of the invention.

We claim:

1. A method of seismic exploration of subsurface formations, comprising the steps of:
   (a) arranging a series of shotholes along a course to be explored in a seismic line of profile above the subsurface formations;
   (b) positioning body members, each having both a seismic source and a seismic detector mounted therewith, in the series of shotholes along the course to be explored;
   (c) activating one of the seismic sources in a first of the series of shotholes to emit seismic waves;
   (d) detecting seismic waves from the subsurface formations with at least some of the remaining detectors located in a plurality of series of shotholes;
   (e) activating another seismic source in a shothole subsequent to said step of detecting;
   (f) detecting seismic waves from the subsurface formations with the remaining detectors located in a plurality of the shotholes subsequent to said step of activating another seismic source;
   (g) activating additional seismic sources in each of a series of shotholes along the seismic line of profile in a predetermined sequence; and
   (h) detecting seismic waves from the subsurface waves with the remaining detectors subsequent to each step of activating.

2. The method of claim 1, wherein said step of detecting comprises:
   (a) detecting seismic waves from the subsurface formations with the remaining detectors located in each of the series of shotholes.

3. The method of claim 1, further including the step of:
   arranging the series of shotholes in groups of transverse seismic lines of profile.

4. The method of claim 1, wherein said step of detecting comprises:
   detecting seismic waves reflected from the subsurface formations with the remaining detectors located in a plurality of the series of shotholes.

5. The method of claim 1, wherein said step of detecting comprises:
   detecting seismic waves refracted along the subsurface formations with the remaining detectors located in a plurality of the series of shotholes.

6. The method of claim 1, further including the step of:
   arranging the series of shotholes along an irregular seismic line of profile.

7. A method of seismic exploration of subsurface formations, comprising the steps of:
   (a) arranging a series of shotholes in groups of transverse seismic lines of profile;
   (b) positioning body members, each having both a seismic source and a seismic detector mounted therewith, in a series of shotholes over the transverse seismic lines of profile;
   (c) activating one of the seismic sources in a first of the series of shotholes to emit seismic waves; and
   (d) detecting seismic waves from the subsurface formations with at least some of the remaining detectors located in a plurality of the series of shotholes.

* * * * *